United States Patent
Dadu et al.

(10) Patent No.: US 8,356,340 B2
(45) Date of Patent: Jan. 15, 2013

(54) SECURE SUBSCRIBER IDENTITY MODULE SERVICE

(75) Inventors: Saurabh Dadu, Tigard, OR (US); Gyan Prakash, Beaverton, OR (US); Mojtaba Mirashrafi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/332,847

(22) Filed: Dec. 21, 2011

(65) Prior Publication Data

US 2012/0115442 A1 May 10, 2012

Related U.S. Application Data

(62) Division of application No. 12/653,709, filed on Dec. 17, 2009, now Pat. No. 8,171,529.

(51) Int. Cl.
*G06F 7/04* (2006.01)

(52) U.S. Cl. ............ 726/4; 713/156; 713/176; 713/180; 713/182

(58) Field of Classification Search ........................ None
See application file for complete search history.

(56) References Cited

U.S. PATENT DOCUMENTS

| | | | |
|---|---|---|---|
| 6,085,099 A * | 7/2000 | Ritter et al. | 455/466 |
| 6,374,357 B1 | 4/2002 | Mohammed et al. | |
| 7,305,251 B2 * | 12/2007 | Kuchibhotla et al. | 455/552.1 |
| 7,308,431 B2 | 12/2007 | Asokan et al. | |
| 8,023,425 B2 * | 9/2011 | Raleigh | 370/252 |
| 2002/0161723 A1 | 10/2002 | Asokan et al. | |
| 2003/0172278 A1 | 9/2003 | Farnham et al. | |
| 2008/0085737 A1 | 4/2008 | Kim | |
| 2009/0077643 A1 * | 3/2009 | Schmidt et al. | 726/6 |
| 2009/0093269 A1 * | 4/2009 | Lee | 455/552.1 |
| 2009/0191897 A1 * | 7/2009 | Johnson et al. | 455/456.3 |
| 2009/0292924 A1 | 11/2009 | Johnson et al. | |
| 2010/0062808 A1 * | 3/2010 | Cha et al. | 455/558 |

FOREIGN PATENT DOCUMENTS

| | | | |
|---|---|---|---|
| JP | 2005515715 A | 5/2005 | |
| JP | 2005525733 A | 8/2005 | |
| JP | 2007104688 A | 4/2007 | |
| JP | 2007235492 A | 9/2007 | |

OTHER PUBLICATIONS

Office Action received for Korean Patent App. No. 2010-0129512, mailed Jul. 4 2012, 4 pages of Korean Office Action and 3 pages of unofficial English summary translation. Office Action received for Japanese Patent App. No. 2010-248262, mailed May 22, 2012, 1 page of Japanese Office Action and 1 page of unofficial English summary translation.

* cited by examiner

*Primary Examiner* — Kaveh Abrishamkar
(74) *Attorney, Agent, or Firm* — Barnes & Thornburg, LLP

(57) ABSTRACT

A method, apparatus, system, and computer program product for a secure subscriber identity module service. Communication via a mobile network is activated in response to receiving a request to activate communication service for the system by a secure partition of the system. In response to receiving the request, a key is retrieved for a permit service from storage accessible only by the secure partition. The key is included in a permit requesting to activate the communication service, and the permit is sent to a service provider for the communication service. The service provider communicates with the permit service to obtain a digital signature for the permit. The secure partition receives a signed permit from the service provider, confirms that the signed permit contains the digital signature by the permit service, and activates the communication service for the system in response to confirming that the signed permit contains the digital signature.

13 Claims, 6 Drawing Sheets

SIM1 Service 352 Mobile Network List

| Priority | Mobile Network | Country Code |
|---|---|---|
| 1 | Mobile Network1 | 01 |
| 2 | Mobile Network2 | 02 |
| 3 | Mobile Network3 | 03 |
| 4 | Mobile Network4 | 01 |

510

SIM2 Service 354 Mobile Network List

| Priority | Mobile Network | Country Code |
|---|---|---|
| 1 | Mobile Network5 | 03 |
| 2 | Mobile Network6 | 04 |
| 3 | Mobile Network7 | 01 |

520

Combined Mobile Network List

| Priority | Mobile Network | Country Code | SIM Service |
|---|---|---|---|
| 1 | Mobile Network1 | 01 | SIM 1 Service 352 |
| 2 | Mobile Network7 | 01 | SIM 2 Service 354 |
| 3 | Mobile Network4 | 01 | SIM 1 Service 352 |

SECURE SUBSCRIBER IDENTITY MODULE SERVICE

RELATED APPLICATION

This application is a divisional application of U.S. application Ser. No. 12/653,709, entitled "SECURE SUBSCRIBER IDENTITY MODULE SERVICE," which was filed on Dec. 17, 2009.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to subscriber identity modules in mobile devices and computer systems communicating via wireless networks.

BACKGROUND

Computers and mobile telephony devices that communicate via wireless networks (also referred to herein as mobile networks) include a physical subscriber identity module (SIM) card. The SIM card securely stores the service-subscriber key, also known as an International Mobile Subscriber Identifier (IMSI), which is assigned by the wireless service provider when service is activated. The SIM card also stores an authentication key that is used by the mobile device to access the device's home mobile network. Currently the service provider must issue a physical SIM card to the mobile device user before service can be activated.

The physical SIM card is tied to the issuing service provider and home network. Each location area of a public land mobile network (PLMN) has a unique identifier which is known as a Location Area Identity (LAI). The Location Area Identity includes a Mobile Country Code (MCC), Mobile Network Code (MNC), and Location Area Code. Base stations in a given mobile network transmit the LAI of the area in the Broadcast Control Channel (BCCH).

The mobile networks with which a given mobile device can communicate are stored in the SIM in various different lists, such as a list of Equivalent Home PLMN (EHPLMN), which provides information about cells within the home network location area, or in user controlled or operator controlled PLMN selector lists that are used to determine which network should be selected. During network registration, the mobile device selects a mobile network from the available PLMNs in its current location. The automatic selection procedure searches the lists of available PLMNs to find a suitable PLMN in accordance with 3GPP specifications TS 23.122, which is available at the URL www-3gpp-org/ftp/Specs/html-info/23122-htm, where the URL has been modified to replace the '.' character with a '-' character to avoid an active hyperlink from within this document. If a suitable match is found, the mobile device registers to the selected PLMN as a home network.

When a mobile device attempts to access a mobile network, the physical SIM card provides the authentication key that is associated with the home network. If the mobile device is outside the home network area, a partner network service provider requests authentication credentials from the home network service provider in order to authorize the mobile device to access the wireless network. The partner service provider imposes "roaming charges" for access to the partner mobile network. To avoid roaming charges, a mobile device user can obtain another physical SIM card for areas to which the user of the mobile device frequently travels, and then switch physical SIM cards when traveling to that area.

BRIEF DESCRIPTION OF THE DRAWINGS

FIG. 5 shows the combination of preferred mobile network lists for two provisioned SIM services in accordance with one embodiment of the invention.

DETAILED DESCRIPTION

Figure 1:
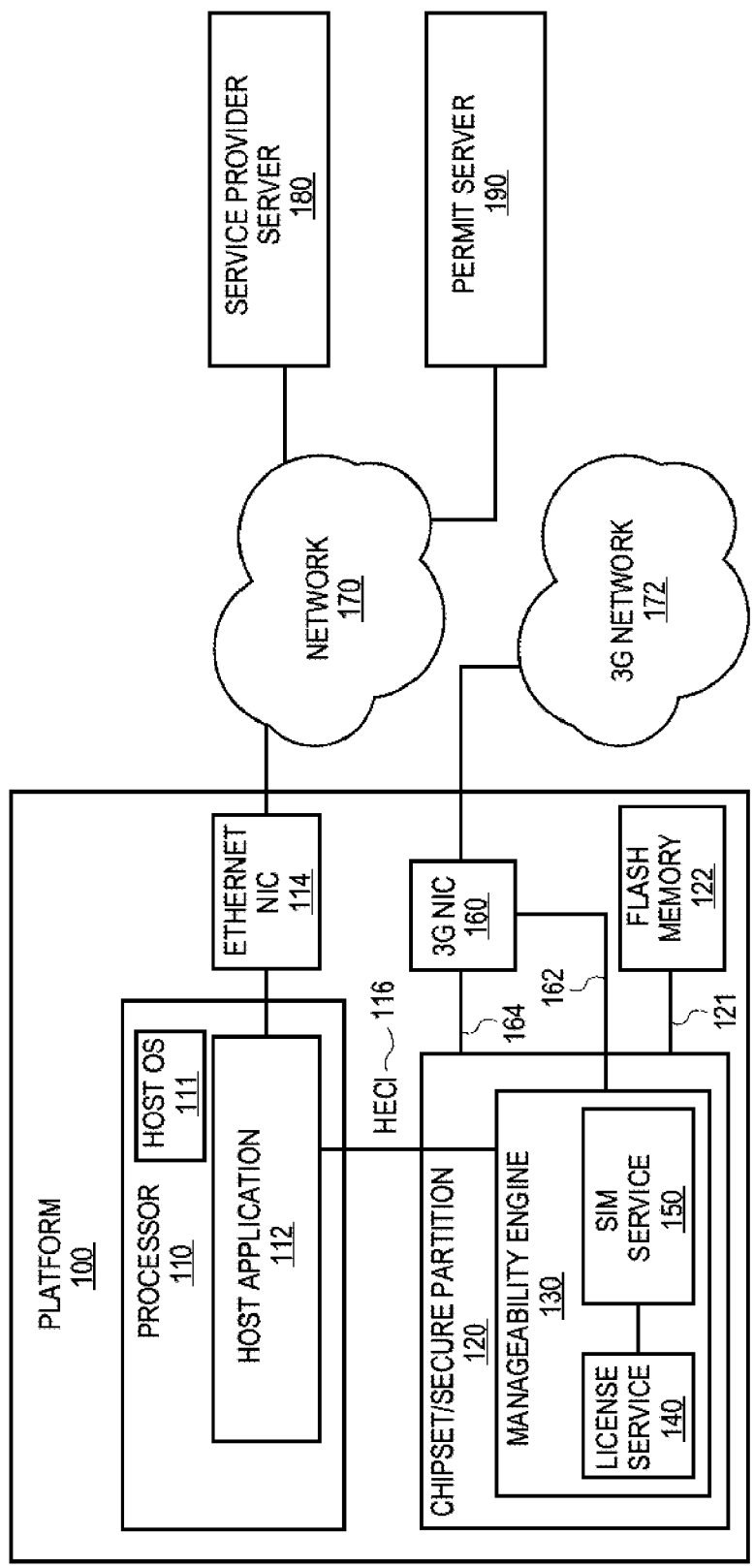
FIG. 1 is a block diagram of a system configured to provide a secure subscriber identity module (SIM) service in accordance with one embodiment of the invention.

Embodiments of the present invention may provide a method, apparatus, system, and computer program product for providing a secure subscriber identity module (SIM) service. In one embodiment, the secure subscriber identity module service is implemented by firmware within a platform chipset rather than with a physical SIM card. By providing an alternative to requiring a physical SIM card to be obtained for the mobile device, wireless communication service can be activated and provisioned immediately. In addition, more than one secure SIM service may be provisioned, and one of the secure SIM services may be selected for communication based upon the location of the mobile device.

Reference in the specification to "one embodiment" or "an embodiment" of the present invention means that a particular feature, structure or characteristic described in connection with the embodiment is included in at least one embodiment of the invention. Thus, the appearances of the phrases "in one embodiment," "according to one embodiment" or the like appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

In one embodiment, the secure subscriber identity module service is provided within a secure partition that ensures an isolated and controlled environment for activating services.

This secure partition ensures that services to be activated on the system are verified as originating with an authenticated source. The secure partition is isolated from a host operating system of the system, thereby ensuring that services to be activated on the system are not subject to tampering.

The isolated and secure environment of the secure platform subscriber identity module may comprise a variety of different types of partitions, including an entirely separate hardware partition (e.g., utilizing Intel® Corporation's Manageability Engine ("ME"), Active Management Technologies ("AMT"), Platform Resource Layer ("PRL") and/or other comparable or similar technologies) and/or a virtualized partition (e.g., a virtual machine in Intel® Corporation's Virtualization Technology ("VT") scheme). It will be apparent to those of ordinary skill in the art that a virtualized host may also be used to implement ME, AMT and PRL technologies (as described in further detail below with reference to FIG. 6.) The secure partition is described herein as being implemented using manageability engine ("ME") technology, but one of skill in the art will recognize that the invention is not so limited and that other implementations are within the scope of the invention.

FIG. 1 is a block diagram of a system configured to enable activation of secure subscriber identity module service in accordance with one embodiment of the invention. Platform 100, which corresponds to a host computer system, includes a processor 110 connected to a chipset/secure partition 120. Processor 110 provides processing power to platform 100 and may be a single-core or multi-core processor, and more than one processor may be included in platform 100. Processor 110 may be connected to other components of platform 100 via one or more system buses, communication pathways or mediums (not shown). Processor 110 may execute applications such as host application 112, which runs under the control of host operating system 111. Host application 112 may communicate with other systems, such as a service provider server 180 or permit server 190, on a network 170 via a network controller such as Ethernet NIC 114.

Chipset/secure partition 120 includes a manageability engine (ME) 130, which may be implemented as an embedded microprocessor that operates independently of host processor 110, to manage the configuration and operation of platform 100. In one embodiment, processor 110 operates under the direction of a host operating system 111, whereas manageability engine (ME) 130 provides a secure and isolated environment that cannot be accessed by the host operating system 111. In one embodiment, manageability engine (ME) 130 authenticates users, controls access to peripheral devices, manages encryption keys for protection of data stored on storage devices of platform 100, and provides a secure environment for activation of a secure subscriber identity module (SIM) service. In one embodiment, manageability engine (ME) 130 is configured to operate in a trust relationship with an external entity such as permit server 190 using asymmetric RSA public key cryptography, as described further below.

In one embodiment, communication between a host application 112 running on processor 110 and manageability engine (ME) 130 occurs via a host embedded controller interface (HECI) 116. In order to take advantage of the trust relationship between the manageability engine (ME) 130 and the external entity such as permit server 190, host application 112 may obtain a signature from the external entity such as permit server 190 for data that host application 112 wishes to communicate to manageability engine (ME) 130.

Platform 100 includes flash memory 122 and may include other memory devices (not shown) such as a dynamic random access memory (DRAM), static random access memory (SRAM), as well as external storage devices accessible via a storage controller (not shown). These memory devices may include random access memory (RAM) and read-only memory (ROM). For purposes of this disclosure, the term "ROM" may be used in general to refer to non-volatile memory devices such as erasable programmable ROM (EPROM), electrically erasable programmable ROM (EEPROM), flash ROM, flash memory, etc. Storage devices may also include mass storage devices such as integrated drive electronics (IDE) hard drives, and/or other devices or media, such as floppy disks, optical storage, tapes, flash memory, memory sticks, digital video disks, biological storage, etc.

Flash memory 122 is accessible by chipset/secure partition 120 via flash interface 121. Data stored in flash memory 122 may be encrypted. The encryption/decryption keys to enable secure communication between platform 100 and other systems such as permit server 190 via network 170 may be stored in the flash memory 122 during manufacture of chipset/secure partition 120 and manageability engine (ME) 130. These encryption/decryption keys stored during manufacture of chipset/secure partition 120 and manageability engine (ME) 130 establish a trust relationship between manageability engine (ME) 130 and an external entity such as permit server 190. Data that is signed by a private key associated with the public key stored in flash memory 122 can be trusted by manageability engine (ME) 130.

Flash memory 122 may also contain firmware (not shown) used to initialize platform 100. This initialization firmware may include Basic Input/Output System (BIOS) firmware to identify and initialize system component hardware (such as the video display card and hard disk) and some other hardware devices including manageability engine (ME) 130. BIOS firmware prepares system component hardware of platform 100 to operate in a known low capability state, so other software programs stored on various media, including an operating system, can be loaded, executed, and given control of platform 100. Flash memory 122 may also include chipset firmware (not shown) to configure chipset/secure partition 120.

Processor 110 may also be communicatively coupled to additional components, such as video controllers, small computer system interface (SCSI) controllers, network controllers, universal serial bus (USB) controllers, input devices such as a keyboard and mouse, etc. Platform 100 may also include one or more bridges or hubs, such as a memory controller hub, an input/output (I/O) controller hub, a PCI root bridge, etc., for communicatively coupling various system components. As used herein, the term "bus" may be used to refer to shared communication pathways, as well as point-to-point pathways.

Some components, such as Ethernet NIC 114 for example, may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Platform 100 may be controlled, at least in part, by input from conventional input devices, such as keyboards, mice, etc., and/or by commands received from another machine, biometric feedback, or other input sources or signals. Platform 100 may utilize one or more connections to one or more remote data processing systems (such as service provider server 180 or permit server 190), such as through Ethernet network interface controller (NIC) 114, a modem, or other communication ports or couplings.

Platform 100 may be interconnected to other processing systems such as service provider server 180 or permit server 190) by way of a physical and/or logical network 170, such as a local area network (LAN), a wide area network (WAN), an intranet, the Internet, etc. Communications involving network 170 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc. Platform 100 includes Ethernet network interface controller 114 for communicating using an Ethernet protocol. Platform 100 also includes 3G NIC 160 for communicating via a 3G wireless protocol in 3G network 172.

Activation of a secure platform subscriber identity module service such as SIM service 150 enables platform 100 to communicate wirelessly via 3G NIC 160 and 3G network 172 using a 3G wireless network protocol. 3G NIC 160 is connected to chipset/secure partition 120 via interconnect 164, which may be, for example, a USB connection. 3G NIC 160 is also connected to manageability engine 130 via interconnect 162, which may be a separate physical bus enabling manageability engine 130 to communicate via 3G network 172.

Manageability engine (ME) 130 includes license service 140 and SIM service 150. In one embodiment, license service 140 is implemented as a firmware module that works in conjunction with permit server 190 to activate services such as SIM service 150 on platform 100. For example, license service 140 and permit server 190 may be used to enable processor, chipset, and/or platform features that can be activated after platform 100 hardware leaves the factory. These processor, chipset, and/or platform features may be purchased on an OEM production line, at a retail point of sale, or after the hardware has been installed at customer premises. License service 140 may authenticate platform 100 with permit server 190 via signature verification algorithms before services are activated.

SIM service 150 is an example of a service that may be activated via license service 140 and permit server 190. SIM service 150 is initially in the disabled state until activated. When activated, SIM service 150 enables platform 100 to communicate via 3G network 172 using 3G NIC 160. Activation of SIM service 150 is described in further detail below with reference to FIG. 2.

Figure 2:
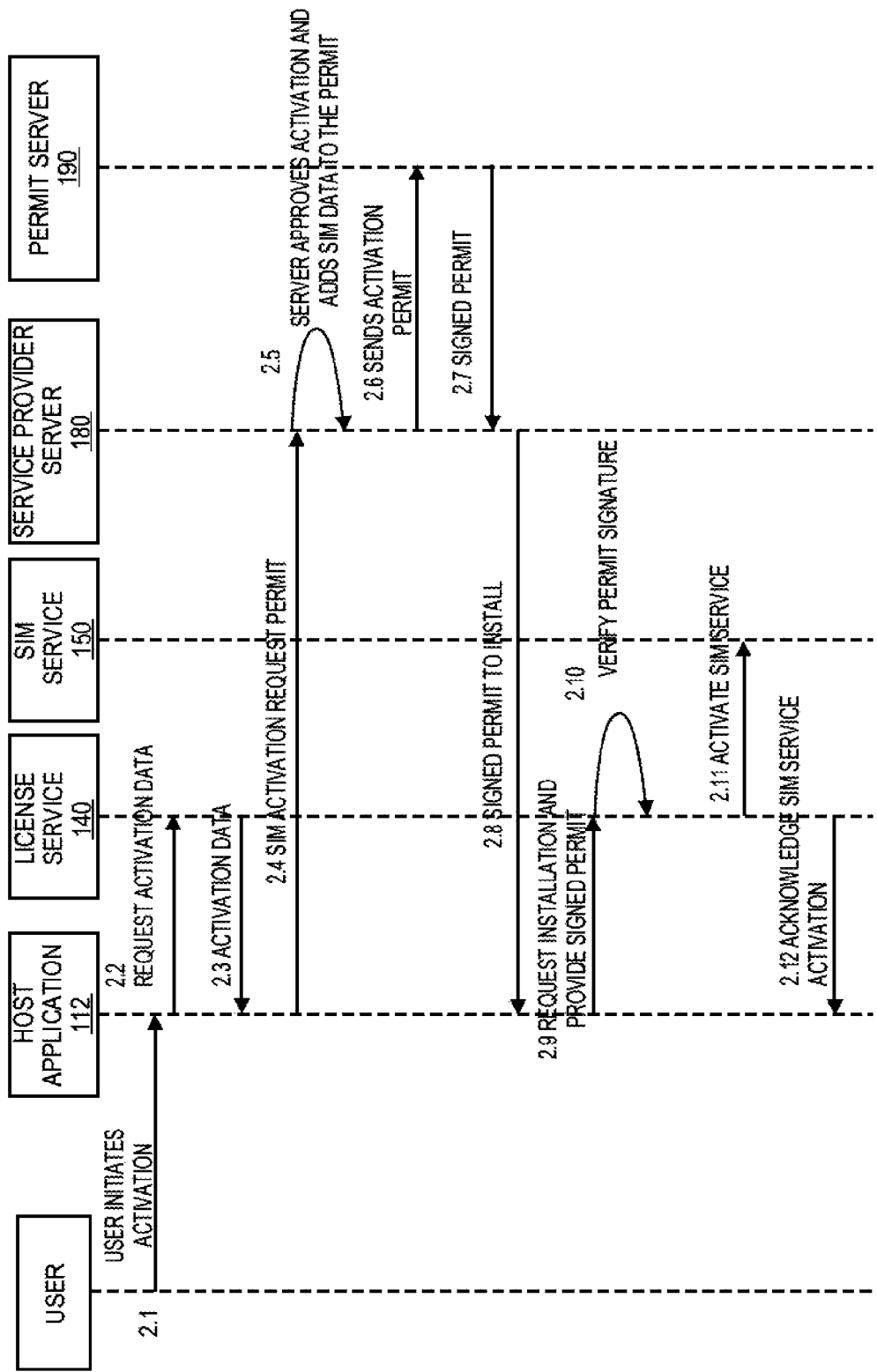
FIG. 2 is a flow diagram showing interaction between a user and components of the system of FIG. 1 in activating communication using a secure subscriber identity module (SIM) service.

FIG. 2 is a flow diagram showing interaction between a user and components of the system of FIG. 1 in activating communication using a secure subscriber identity module (SIM) service. In action 2.1, the user initiates activation of communication service. In one embodiment, the user uses a web browser (not shown) running on processor 110 to connect to service provider server 180 via Ethernet NIC 114 and network 170. From the service provider server 180, the user downloads and runs an application, such as host application 112, to initiate activation of wireless communication service. In action 2.2, host application 112 requests activation data from license service 140 of manageability engine 130 via host embedded controller interface (HECI) 116. In response to the request for activation data from host application 112, license service 140 may generate an activation request permit. The activation request permit may include a nonce, which is a random number used only once, to uniquely identify the activation request and protect against replay attacks by malware. In action 2.3, license service 140 returns activation data to host application 112, such as the activation request permit including the nonce.

In action 2.4, host application 124 forwards the SIM activation request permit to service provider server 180. In action 2.5, service provider server 180 approves activation of communication service and adds SIM data to the activation request permit. For example, service provider server 180 may confirm that payment has been received prior to approving the activation of service. Service provider server 180 may modify the activation request permit by adding information such as a server-subscriber key (also known as an International Mobile Subscriber Identity (IMSI), an international unique number of the mobile user). The first three digits of the server-subscriber key/IMSI represent the Mobile Country Code (MCC); the next two digits represent the Mobile Network Code (MNC); and the next ten digits represent the mobile station identification number. Service provider server 180 may also assign an authentication key to the subscriber identity module that the SIM will use for authentication on 3G network 172. Service provider server 180 may also modify the activation request permit by adding the authentication key. Service provider server 180 stores the authentication key for the SIM in a database on its own network. When adding SIM data to the activation request permit, service provider server 180 may also add its own public key to the activation request permit to facilitate future communication with platform 100 manageability engine (ME) 130 in managing SIM service 150. Because the activation request permit is to be signed by permit server 190, which has a trust relationship with manageability engine (ME) 130, obtaining the digital signature of permit server 190 for the public key of service provider server 180 will delegate the trust relationship from permit server 190 to service provider server 180 in future communications with manageability engine (ME) 130.

In action 2.6, service provider server 180 forwards the activation request permit to permit server 190. Upon receipt of the activation request permit, permit server 190 may confirm information included in the activation request permit. For example, permit server 190 may confirm that a license to activate particular functionality of platform 100 has been arranged. Permit server 190 may also inspect the activation request permit for information about platform 100 and/or manageability engine (ME) 130 to confirm that a trust relationship exists with the platform on which the feature is to be activated. If permit server 190 approves activation of secure subscriber identity module (SIM) service for platform 100, then permit server 190 adds a digital signature to the activation request permit, thereby creating a signed activation request permit. The digital signature provided by permit server 190 provides evidence that permit server 190 received the activation request permit and reflects a trust relationship between manageability engine (ME) 130 and permit server 190. Manageability engine (ME) 130 can use its copy of the public key for permit server 190 to verify that the digital signature originated with permit server 190. If the activation request permit contains the public key for service provider server 180, the digital signature of permit server 190 on the public key will delegate the trust relationship from permit server 190 to service provider server 180 in future communications with manageability engine (ME) 130.

In action 2.7, permit server 190 returns the signed activation request permit to service provider server 180. In action 2.8, service provider server 180 provides the signed activation request permit to host application 112. In action 2.9, host application 112 sends a request for installation along with the signed activation request permit to license service 140 of manageability engine 130. In action 2.10, license service 140 verifies the digital signature in the signed activation request permit using the public key for permit server 190 that is stored in secure storage for manageability engine 130, such as in flash memory 122. License server 140 will not take further action in response to the signed activation request permit if the digital signature cannot be verified as having originated with permit server 190. License service 140 may further verify that the nonce provided in the signed activation request permit matches the nonce originally generated for the activation request permit.

In action 2.11, license service 140 activates SIM service 150 by executing code contained in a firmware module for SIM service 150 that is stored in flash memory 122. For example, drivers needed to communicate with the 3G NIC may be loaded. After the 3G NIC drivers are loaded, the SIM service 150 is ready to respond to commands received from the 3G NIC. In one embodiment, the signed activation request permit is stored in secure storage for manageability engine 130, such as in flash memory 122. If the signed activation request permit includes a public key for service provider server 180, the public key for service provider server 180 may also be stored in flash memory 122. The digital signature of permit server 190 for the public key of service provider server 180 delegates the trust relationship from permit server 190 to service provider server 180 in future communications with manageability engine (ME) 130. In action 2.12, license service 140 acknowledges that SIM service 150 has been activated to host application 112.

Once activated, SIM service 150 provides SIM functionality to 3G NIC 160. 3G NIC 160 can register with the service provider server 180 as a node in the 3G network 172. If a public key for service provider server 180 was added to the signed activation request permit, then service provider server 180 can remotely manage SIM service 150. For example, service provider 180 may remotely manage SIM service 150 by subsequently deactivating communication service, making changes to SIM data such as PLMN lists, and/or changing parameters of the communication service. Service provider server 180 would send a command to modify a parameter of the communication service in a communication associated with the public key of service provider server 180. For example, the communication may be signed using the private key of service provider server 180. Manageability engine (ME) 130 could then use the public key of service provider server 180 that was signed by permit server 190 to verify that the communication originated with service provider server 180.

Operation of SIM service 150 to provide communication service to platform 100 occurs as follows. In one embodiment, when 3G NIC 160 starts up, 3G NIC 160 obtains the International Mobile Subscriber Identity (IMSI) from SIM Service 150. SIM service 150 retrieves the signed activation request permit including the International Mobile Subscriber Identify (IMSI) and authentication key from secure storage associated with manageability engine 130, such as from flash memory 122. 3G NIC 160 passes the IMSI to the service provider server 180 requesting access and authentication.

Service provider server 180 searches its database for the incoming IMSI and its associated Authentication Key. Service provider server 180 then generates a Random Number (RAND, which is a nonce) and signs it with the Authentication Key associated with the IMSI (and stored with the SIM service 150), computing another number known as Signed Response 1 (SRES_1). Signed Response 1 (SRES_1) is a challenge to authenticate before access to the network of service provider server 180 is allowed. Service provider server 180 sends the RAND to 3G NIC 160, which passes the RAND to SIM Service 150. SIM Service 150 signs the RAND with its Authentication Key, producing a second Signed Response SRES_2. SIM Service 150 gives SRES_2 to the 3G NIC along with an encryption key Kc. 3G NIC 160 passes SRES_2 on to service provider server 180. Service provider server 180 compares its computed SRES_1 with the computed SRES_2 returned by 3G NIC 160. If the two numbers match, SIM Service 150 has met the challenge and is therefore authenticated and the 3G NIC 160 is granted access to the network 172 provided by service provider server 180. The key Kc is used to encrypt all further communications between 3G NIC 160 and the network of service provider server 180.

The system described with reference to FIGS. 1 and 2 enables a system, either a mobile telephone device or a laptop, to activate communication service via a mobile network without having a physical SIM card. Communication via a mobile network is activated in response to receiving a request to activate communication service for the system by a secure partition of the system. In response to receiving the request, a permit requesting to activate the communication service is created, and the permit is sent to a service provider for the communication service. The service provider communicates with the permit service to obtain a digital signature for the permit to activate the service. The secure partition receives a signed permit from the service provider, retrieves a key for the permit service from storage accessible only by the secure partition, uses the key to confirm that the signed permit contains a digital signature by the permit service, and activates the communication service for the system in response to confirming that the signed permit contains the digital signature by the permit service.

In one embodiment, the secure partition generates a nonce for the permit and confirms that the signed permit contains the nonce prior to activating the communication service for the system. The signed permit may be stored in the storage accessible only by the secure partition. In one embodiment, the key for the permit service is embedded in the storage accessible only by the secure partition at the time of manufacture of hardware for the secure partition.

The signed permit may also contain a key for the service provider, and when a subsequent communication is received from the service provider, the secure partition may confirm that the subsequent communication is associated with the key for the service provider prior to acting in response to the subsequent communication.

Another feature of the invention includes a service provider service that receives a permit requesting to activate communication service from a requesting system. The service provider adds a key to the permit and obtains a signed permit from a permit service. The permit service adds a digital signature to the permit to create the signed permit. The service provider sends the signed permit to the requesting system, and the requesting system verifies that the signed permit contains the digital signature by the permit service prior to activating the communication service for the system. The service providers send a subsequent communication to the requesting system, where the subsequent communication contains a command to modify a parameter of the communication service. The requesting system verifies that the subsequent communication is associated with the key prior to modifying the communication service.

To deactivate communication service, a similar process to the process described with regard to steps 2.1 through 2.12 of FIG. 2 is followed, with the activation request permit being replaced by a deactivation request permit, and null data replacing the SIM data in the signed deactivation request permit.

By enabling activation of communication card without a physical SIM card, the secure subscriber identity module service enables wireless communication service to be activated immediately. Wireless communication service can be activated on a computer that does not have a slot for a physical SIM card. The secure subscriber identity module service enables wireless service providers to activate and/or upgrade SIM properties and provision services without physical SIM cards. By providing the secure subscriber identity module service in a secure partition that is isolated from a host operating system for the mobile device, wireless communication service is protected from identity theft attacks and denial of service attacks. Because the firmware module for SIM service resides in chipset hardware, communication service can be provided even if storage devices and/or operating systems change or are compromised on the host system.

Because the secure subscriber identity module service does not require a physical SIM card, more than one subscriber identity module service can be provisioned for a given mobile device/platform. The ability to provision multiple SIM services for a single platform benefits users who travel and need access to multiple mobile networks. With multiple SIM services available to connect to different mobile networks, the location of the mobile device can be used to identify the appropriate SIM service for mobile communication.

Figure 3:
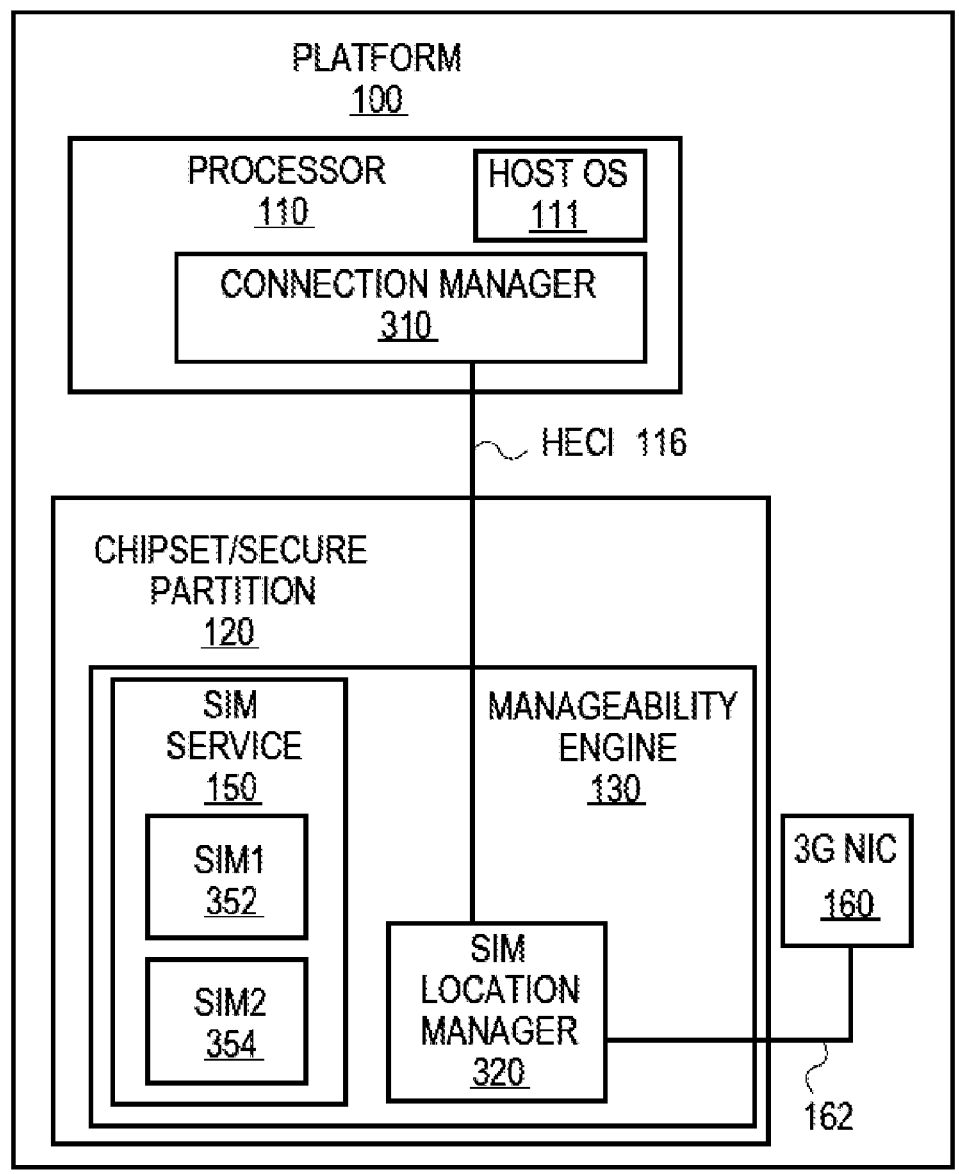
FIG. 3 is a block diagram of a system configured to provide multiple secure subscriber identity modules (SIM) services in accordance with one embodiment of the invention.

FIG. 3 is a block diagram of a system configured to provide multiple secure subscriber identity modules (SIMs) in accordance with one embodiment of the invention. SIM service 150 shows two different SIM services that have been provisioned for platform 100, SIM1 service 352 and SIM2 service 354. For example, SIM1 service 352 may be service provisioned for a U.S. mobile network, whereas SIM2 service 354 may be service provisioned for a Canadian mobile network. SIM service 150 can assume the identity of either SIM1 service 352 or SIM2 service 354, depending upon the location of platform 100. Connection manager 310 running on processor 110 (under control of a host operating system 111) communicates with SIM location manager 320 within manageability engine (ME) 130 via host embedded controller interface (HECI) 116. When a user of platform 100 initiates wireless communication, connection manager 310 requests SIM location manager 320 within manageability engine (ME) 130 to establish a connection for wireless communication via 3G NIC 160. SIM location manager 320 communicates via 3G NIC 160 to determine the available mobile networks and then causes SIM service 150 to assume the identity of the most appropriate provisioned SIM service, such as one of SIM1 service 352 or SIM2 service 354. The operation of SIM location manager 320 in identifying the most appropriate provisioned SIM service is described in further detail below with reference to FIG. 4.

Figure 4:
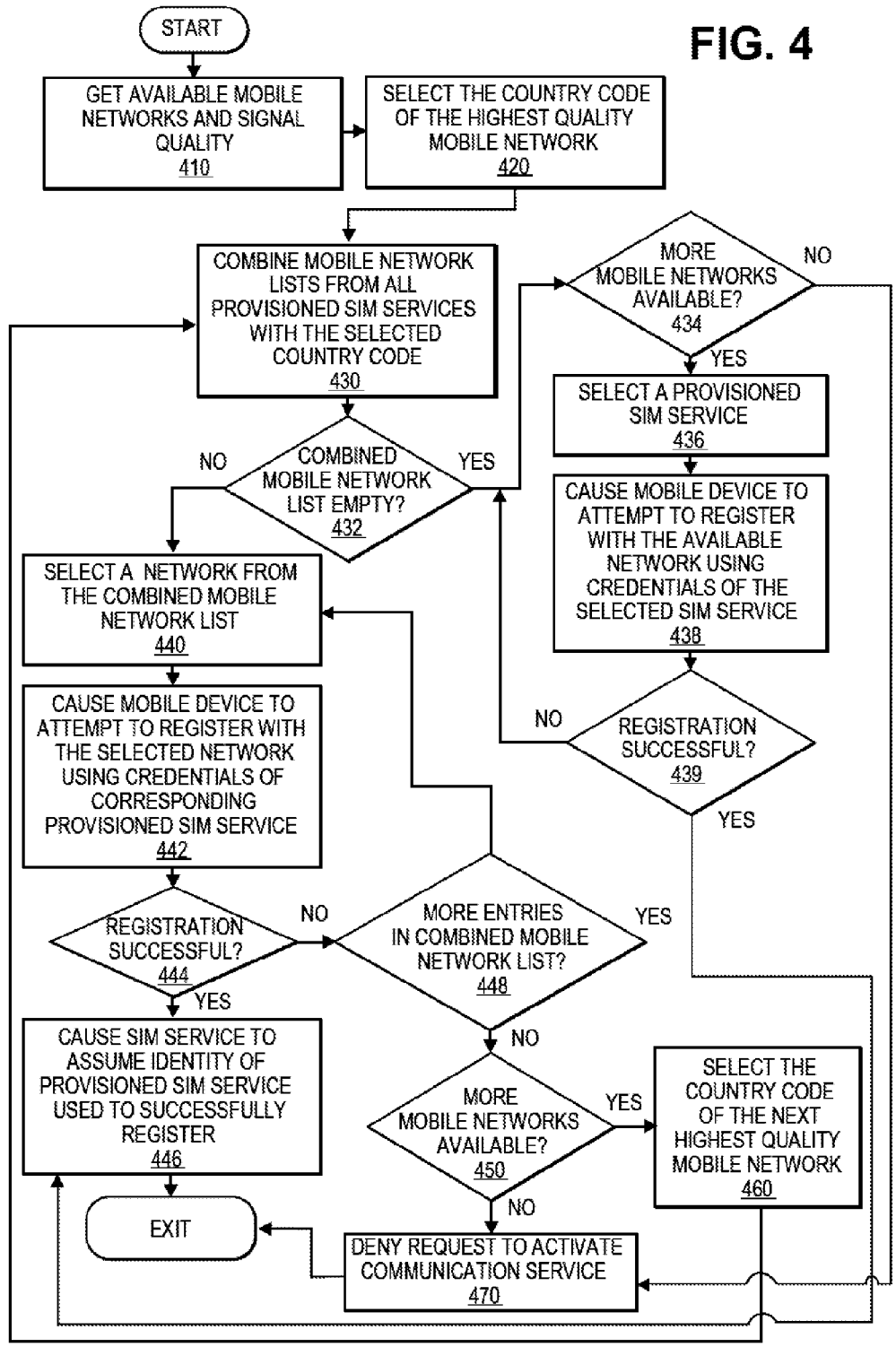
FIG. 4 is a flowchart of a method to select a secure SIM service from multiple provisioned subscriber identity module (SIM) services based upon the location of the host device.

FIG. 4 is a flowchart of a method to select a SIM service from multiple provisioned subscriber identity module (SIM) services based upon the location of the host device. SIM location manager 320 is configured to allow the mobile device to register to one of the home networks as specified by the preferred mobile network lists of the provisioned SIM services. This configuration ensures that roaming charges are avoided unless none of the home networks are available. If multiple home networks are available, the home network with the highest quality signal is selected.

In "Get Available Mobile Networks and Signal Quality" step 410, SIM location manager 320 asks 3G NIC 160 for a list of available mobile networks (PLMNs) and the associated signal quality for each network. Upon receiving the list of available mobile networks, SIM location manager 320 selects the country code (such as the Mobile Country Code (MCC)) of the highest quality signal in "Select the Country Code of the Highest Quality Mobile Network" step 420. If multiple mobile networks/country codes have the same signal quality (which may be possible in border areas), other criteria may be used or the country code may selected randomly.

In "Combine Mobile Network Lists from all Provisioned SIM Services with the Selected Country Code" step 430, SIM location manager 320 creates a new preferred mobile network list by matching the selected country code with the country codes of the mobile networks in the preferred lists of the provisioned SIM services. In one embodiment, the new preferred mobile network list is arranged so that the entries maintain their original priority order across the SIM services and within a SIM service. If multiple SIM services have matching entries at the same priority level, then other criteria may be used or the mobile networks may be assigned priorities randomly. Combining mobile network lists is discussed further below with reference to FIG. 5.

Once a combined mobile network list is developed, control proceeds to "Combined Mobile Network List Empty?" decision point 432. At "Combined Mobile Network List Empty?" decision point 432, SIM location manager 320 checks to see whether the combined mobile network list is empty. If the list is not empty, control proceeds to "Select a Network from the Combined Mobile Network List" step 440.

Once a combined mobile network list is developed, SIM location manager 320 may provide the combined mobile network list to 3G NIC 160 and/or instruct 3G NIC 160 to attempt to register with each network on the combined mobile network list one at a time. Control proceeds to "Select a Network from the Combined Mobile Network List" step 440. SIM location manager 320 may select a network based upon its priority in the combined mobile network list. Once the network is selected, control proceeds to "Cause Mobile Device to Attempt to Register with the Selected Network using Credentials of Corresponding Provisioned SIM Service" step 442. Because the corresponding provisioned SIM service has been identified by selecting a network, the corresponding provisioned SIM service also may be considered to be selected from the provisioned SIM services. SIM location manager 320 causes the mobile device to attempt to register with the selected network by providing the credentials of the corresponding provisioned SIM service to 3G NIC 160. 3G NIC 160 uses the provided credentials to attempt to register with the selected network.

Control then proceeds to "Registration Successful?" decision point 444. If registration with the selected network was successful, control proceeds to "Cause SIM Service to Assume Identity of Provisioned SIM Service used to Successfully Register" step 446. SIM location manager 320 notifies SIM Service 150 of the identity of the successfully registered provisioned SIM service, and SIM service 150 assumes the identity of the provisioned SIM service that was used to successfully register with the selected network. Only the identity of the successfully registered provisioned SIM service will be used by SIM service 150 to attempt 3G network communication.

After SIM service 150 assumes the identity of the provisioned SIM service that was used to successfully register with the selected network, other provisioned SIM services may remain inactive. These other provisioned SIM services potentially may be managed by a corresponding service provider to receive changes to SIM data and/or changes in service parameters as described above with reference to subsequent communications from service provider 180.

At "Registration Successful?" decision point 444, if registration with the selected network was not successful, control proceeds to "More Entries in Combined Mobile Network List?" decision point 446. If additional entries are available in the combined mobile network list, control returns to "Select a Network from the Combined Mobile Network List" step 440, where SIM location manager 320 selects a different network for attempted registration.

At "More Entries in Combined Mobile Network List?" decision point 448, if no more entries exist in the combined mobile network list, control proceeds to "More Mobile Networks Available?" step 450. Even though the combined mobile network list has been exhausted, it is possible that other mobile networks with different country codes may have been identified at "Get Available Mobile Networks and Signal Quality" step 410. Control proceeds to "Select the Country Code of the Next Highest Quality Mobile Network" step 460. Control then returns to "Combine Mobile Network Lists from all Provisioned SIM Services with the Selected Country Code" step 430, where a new combined preferred mobile network list is developed from the provisioned SIM services with the selected country code and provided to 3G NIC 160.

At "More Mobile Networks available?" decision point 450, if no networks remain in the group of available networks originally identified in "Get Available Mobile Networks and Signal Quality" step 410, establishing a connection between the mobile device and a mobile network has been unsuccessful. Control proceeds to "Deny Request to Activate Communication Service" step 470. SIM location manager 320 has been unable to establish communication service for the device and denies the request to activate communication service for the device.

Returning to "Combined Mobile Network List Empty?" decision point 432, SIM location manager 320 checks to see whether the combined mobile network list is empty. Such a situation may occur when none of the available networks corresponds to the provisioned SIM services or when registration failed with the only provisioned SIM service in the combined mobile network list. If the list is empty, control proceeds to "More Mobile Networks Available?" decision point 434. If no more mobile networks are available, control proceeds to "Deny Request to Activate Communication Service" step 470, where the request to activate communication service is denied.

At "More Mobile Networks Available?" decision point 434, if there are available mobile networks remaining in the location of the mobile device, control proceeds to "Select a Provisioned SIM Service" step 436. Although there may not be an already-provisioned SIM service for the available network, an attempt can be made to connect to the available network as a roaming device using credentials of one of the provisioned SIM services. The selection of a provisioned SIM service can be made using the Mobile Country Code of the available network and using a SIM service with an International Mobile Subscriber Identifier (IMSI) for that country.

If none of the provisioned SIM services matches the Mobile Country Code of the available mobile network, one of the provisioned SIM services can be selected randomly or based upon some other selection criterion. Control proceeds to "Cause Mobile Device to Attempt to Register with the Available Network using Credentials of the Selected SIM Service" step 438. SIM location manager 320 causes the mobile device to attempt to register with the selected network by providing the credentials of the corresponding provisioned SIM service to 3G NIC 160. 3G NIC 160 uses the provided credentials to attempt to register with the selected network.

Control then proceeds to "Registration Successful?" decision point 439. If registration is successful, control proceeds to "Cause SIM Service to Assume Identity of Provisioned SIM Service Used to Successfully Register" step 446 and proceeds as described above. If registration is not successful, control returns to "More Mobile Networks Available" step 434 and proceeds as described above. An attempt will be made using every provisioned SIM service and every available network until either registration succeeds or until all available networks are exhausted.

The operation of SIM location manager 320 has been described with reference to FIG. 4 in an embodiment in which the SIM location manager runs in the manageability engine (ME) 130. In another embodiment, SIM location manager 320 may run on processor 110 under control of the host operating system 111. In such an implementation, SIM location manager 320 may interact with other host applications, such as a GPS application, to select mobile networks based upon the location of the host device. SIM location manager 320 may also have access to billing data for each SIM service so that a mobile network that minimizes cost to the user may be selected. In one embodiment, SIM location manager 320 enables a user to configure preferences for provisioned SIM services and location areas.

FIG. 5 shows the combination of preferred mobile lists for two provisioned SIM services in accordance with one embodiment of the invention. The combination of preferred mobile network lists was described above with reference to "Combine Mobile Network Lists from all Provisioned SIM Services with the Selected Country Code" step 430 of FIG. 4. Referring to FIG. 5, SIM1 service 352 Mobile Network List 510 shows the following preferred mobile networks listed in priority order: Mobile Network1 (Country Code 01), Mobile Network2 (Country Code 02), Mobile Network3 (Country Code 03), and Mobile Network4 (Country Code 01). SIM2 service 354 Mobile Network List 520 has the following preferred mobile networks listed in priority order: Mobile Network5 (Country Code 03), Mobile Network6 (MCC 04), and Mobile Network7 (MCC 01). Assume that the MCC selected is MCC 01. The resulting Combined Preferred Mobile Network List 530 includes the following mobile networks in priority order: Mobile Network1, Mobile Network7, and Mobile Network4. In this example, the mobile network lists have been combined such that the priority order of mobile networks within SIM1 service 352 is retained (Mobile Network1 is first, followed by Mobile Network4), and the priority order of mobile networks across SIM services is also retained by placing Mobile Network1 first, since Mobile Network1 is priority 1 for SIM1 service 352, followed by Mobile Network7, which is third priority for SIM2 service 354, followed by Mobile Network4, which is fourth priority for SIM1 service 352.

In one embodiment, a mobile network is selected from at least one mobile network available at a location of a system. A plurality of provisioned SIM services for the system is identified, and a provisioned SIM service is selected. A credential of the selected provisioned SIM service is used to attempt communication with the selected mobile network.

In one embodiment, mobile network lists for each of the plurality of provisioned SIM services are combined to create a combined mobile network list, and the selected mobile network is selected from the combined mobile network list. In one embodiment, a highest-quality mobile network is identified that provides a highest quality of service of services available from the at least one mobile network available at the location. A country code of the highest-quality mobile network is identified, and the country code is used to select mobile networks to be included in the combined mobile network list. In one embodiment, a SIM service in a secure partition of the system assumes an identity of the selected SIM service.

Figure 6:
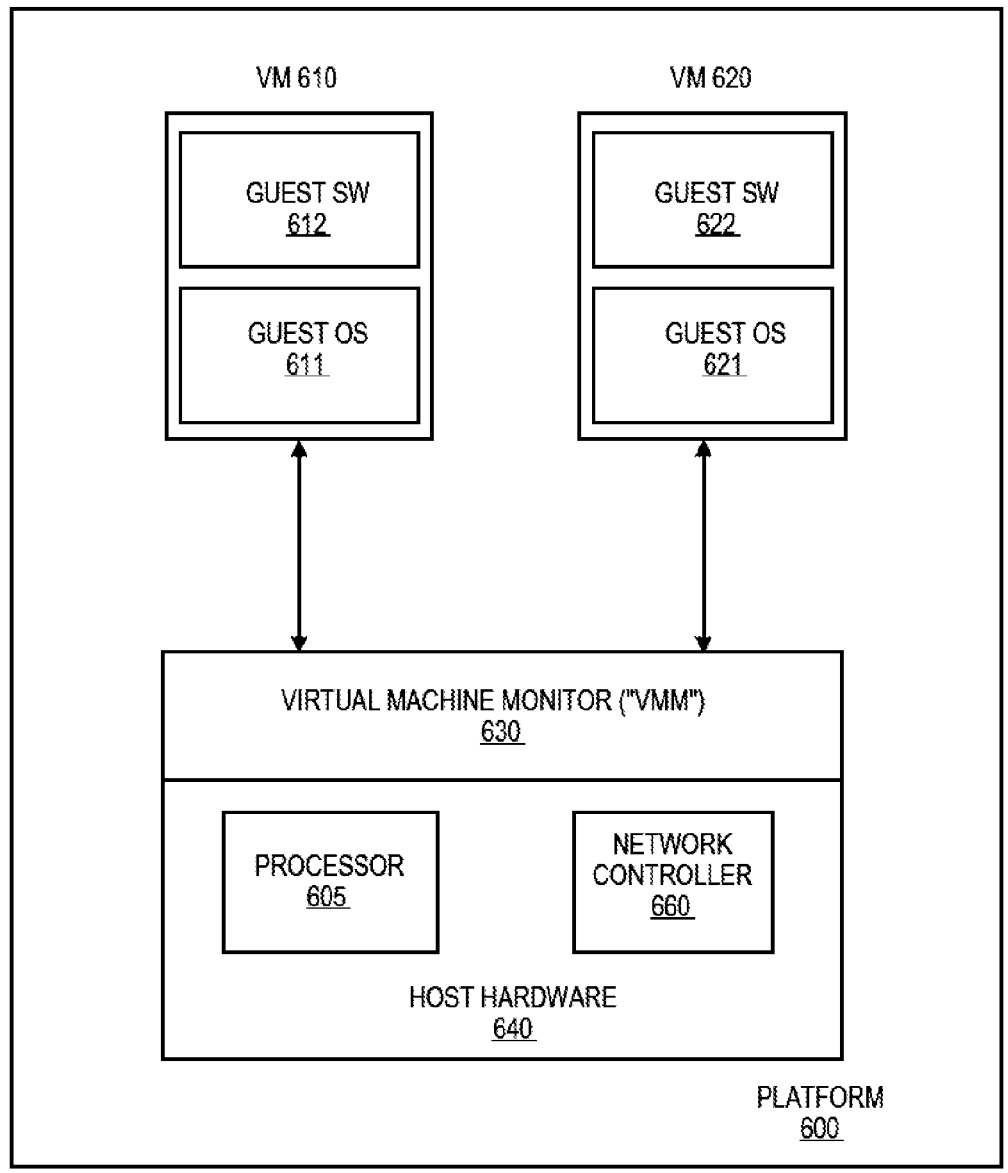
FIG. 6 shows a virtual machine environment for implementing a secure subscriber identity module service in accordance with one embodiment of the invention.

FIG. 6 shows a virtual machine environment for implementing a secure subscriber identity module service in accordance with one embodiment of the invention. If platform 600 is virtualized, it may include only a single processor but a virtual machine monitor ("VMM 630") on the host may present multiple abstractions and/or views of the host, such that the underlying hardware of the host appears as one or more independently operating virtual machines ("VMs"). VMM 630 may be implemented in software (e.g., as a standalone program and/or a component of a host operating system), hardware, firmware and/or any combination thereof. VMM 630 manages allocation of resources on the host and performs context switching as necessary to cycle between various VMs according to a round-robin or other predetermined scheme. It will be readily apparent to those of ordinary skill in the art that although only one processor is illustrated ("Processor 605"), embodiments of the present invention are not so limited and multiple processors may also be utilized within a virtualized environment.

Although only two VM partitions are illustrated ("VM 610" and "VM 620", hereafter referred to collectively as "VMs"), these VMs are merely illustrative and additional virtual machines may be added to the host. VM 610 and VM 620 may function as self-contained platforms respectively, running their own "guest operating systems" (i.e., operating systems hosted by VMM 630, illustrated as "Guest OS 611" and "Guest OS 621" and hereafter referred to collectively as "Guest OS") and other software (illustrated as "Guest Software 612" and "Guest Software 622" and hereafter referred to collectively as "Guest Software").

Each Guest OS and/or Guest Software operates as if it were running on a dedicated computer rather than a virtual machine. That is, each Guest OS and/or Guest Software may expect to control various events and have access to hardware resources on platform 600. Within each VM, the Guest OS and/or Guest Software may behave as if they were, in effect, running on platform 600's physical hardware ("Host Hardware 640", which may include a network controller 660).

It will be readily apparent to those of ordinary skill in the art that a physical hardware partition with a dedicated processor such as manageability engine (ME) 130 of FIG. 1 may provide a higher level of security than a virtualized partition (as illustrated in FIG. 6), but embodiments of the invention may be practiced in either environment and/or a combination of these environments to provide varying levels of security. It will also be readily apparent to those of ordinary skill in the art that an ME, AMT or PRL platform may be implemented within a virtualized environment. For example, VM 620 may be dedicated as an ME partition on a host while VM 610 runs typical applications on the host. In this scenario, the host may or may not include multiple processors. If the host does include two processors, for example, VM 620 may be assigned the other processor while VM 610 (and other VMs on the host) may share the resources of processor 605. On the other hand, if the host includes only a single processor, the processor may serve both the VMs, but VM 620 may still be isolated from the other VMs on the host with the cooperation of VMM 630. For the purposes of simplicity, embodiments of the invention are described in a manageability engine (ME) environment, but embodiments of the invention are not so limited. Instead, any reference to manageability engine, ME, a "partition", "a secure partition", a "security partition" and/or a "management partition" shall include any physical and/or virtual partition (as described above).

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash programmable memories (FLASH), electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for providing a secure platform-based subscriber identity module service without requiring a physical SIM card. While particular embodiments of the present invention have been shown and described, it will be obvious to those skilled in the art that numerous changes, variations, and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

The invention claimed is:

1. A computer-implemented method comprising:
identifying a highest-quality mobile network that provides a highest quality of service of services available from at least one mobile network available at a location of a system;
identifying a country code of the highest-quality mobile network;
identifying a plurality of provisioned SIM services for the system;
selecting mobile networks from mobile network lists for each of the plurality of provisioned SIM services to be included in a combined mobile network list as a function of the country code of the highest-quality mobile network and the country code associated with each of the selected mobile networks;
selecting a mobile network from the combined mobile network list;
selecting a provisioned SIM service of the plurality of provisioned SIM services;
using a credential of the selected provisioned SIM service to attempt to register with the selected mobile network;
determining whether registration with the selected mobile network is successful; and
selecting another mobile network from the combined mobile network list in response to determining that registration with the selected mobile network was not successful.

2. The method of claim 1, further comprising requesting a signal quality corresponding to each of the at least one mobile network available at the location of the system,
wherein identifying a highest-quality mobile network that provides a highest quality of service of services comprises identifying the mobile network associated with a highest-quality signal of the at least one mobile network available at the location of the system.

3. The method of claim 1, further comprising:
determining whether registration with each mobile network from the combined mobile network list was unsuccessful;
identifying a next highest-quality mobile network that provides a next-highest quality of service of services from the at least one mobile network available at the location, the next highest-quality mobile network associated with a different country-code than the country code of the highest-quality mobile network; and
selecting additional mobile networks to be included in a new combined mobile network list as a function of the country code of the next highest-quality mobile network and the country code associated with each of the selected additional mobile networks.

4. The method of claim 1, further comprising:
causing a SIM service in a secure partition of the system to assume an identity of the selected provisioned SIM service, wherein the secure partition is isolated from a host operating system of the system.

5. An apparatus comprising:
at least one processor;
a secure partition isolated from a host operating system for the at least one processor; and
a memory comprising instructions for at least one service executing in the secure partition to perform the following:
identifying a highest-quality mobile network that provides a highest quality of service of services available from at least one mobile network available at a location of the apparatus;
identifying a country code of the highest-quality mobile network;
identifying a plurality of provisioned SIM services for the apparatus;
selecting mobile networks from mobile network lists for each of the plurality of provisioned SIM services to be included in a combined mobile network list as a function of the country code of the highest-quality mobile network and the country code associated with each of the selected mobile networks;
selecting a mobile network from the combined mobile network list;
selecting a provisioned SIM service from the plurality of provisioned SIM services; and
using a credential of the selected provisioned SIM service to attempt communication with the selected mobile network.

6. The apparatus of claim 5, further comprising instructions for requesting a signal quality corresponding to each of the at least one mobile network available at the location of the apparatus,
wherein identifying a highest-quality mobile network that provides a highest quality of service of services comprises identifying the mobile network associated with a highest-quality signal of the at least one mobile network available at the location of the apparatus.

7. The apparatus of claim 5, further comprising instructions for:
attempting to register with each mobile network from the combined mobile network list one at a time; and
determining whether registration with each mobile network from the combined mobile network list is successful.

8. The apparatus of claim 7, further comprising instructions for:
determining whether registration with each mobile network from the combined mobile network list was unsuccessful;
identifying a next highest-quality mobile network that provides a next-highest quality of service of services from the at least one mobile network available at the location, the next highest-quality mobile network associated with a different country-code than the country code of the highest-quality mobile network; and
using the different country-code associated with the next highest-quality mobile network to select additional mobile networks to be included in a new combined mobile network list.

9. The apparatus of claim 5, wherein the instructions further comprise instructions to perform the following:
causing a SIM service in a secure partition of the apparatus to assume an identity of the selected provisioned SIM service.

10. A computer program product comprising:
a computer-readable storage medium; and
instructions in the computer-readable storage medium, wherein the instructions, when executed in a secure partition of a processing system, cause a service executing in the secure partition to perform operations comprising:
identifying a highest-quality mobile network that provides a highest quality of service of services available from at least one mobile network available at a location of the processing system;

identifying a country code of the highest-quality mobile network;

identifying a plurality of provisioned SIM services for the processing system;

selecting mobile networks from mobile network lists for each of the plurality of provisioned SIM services to be included in a combined mobile network list as a function of the country code of the highest-quality mobile network and the country code associated with each of the selected mobile networks;

selecting a mobile network from the combined mobile network list;

selecting a provisioned SIM service from the plurality of provisioned SIM services; and using a credential of the selected provisioned SIM service to attempt communication with the selected mobile network.

11. The computer program product of claim 10, further comprising instructions for:

attempting to register with each mobile network from the combined mobile network list one at a time; and determining whether registration with each mobile network from the combined mobile network list is successful.

12. The computer program product of claim 11, further comprising instructions for:

determining whether registration with each mobile network from the combined mobile network list was unsuccessful;

identifying a next highest-quality mobile network that provides a next-highest quality of service of services from the at least one mobile network available at the location, the next highest-quality mobile network associated with a different country-code than the country code of the highest-quality mobile network; and using the different country-code associated with the next highest-quality mobile network to select additional mobile networks to be included in a new combined mobile network list.

13. The computer program product of claim 10, wherein the instructions further comprise instructions to perform the following:

causing a SIM service in the secure partition to assume an identity of the selected provisioned SIM service.

* * * * *